United States Patent [19]

Smith

[11] 4,293,981
[45] Oct. 13, 1981

[54] CRAB BUTCHERING MACHINE

[76] Inventor: Charles M. Smith, Cordova, Ak.

[21] Appl. No.: 78,036

[22] Filed: Sep. 24, 1979

[51] Int. Cl.³ .............................................. A22C 29/02
[52] U.S. Cl. ........................................................ 17/71
[58] Field of Search ........................... 17/71, 74, 72, 73

[56] References Cited

U.S. PATENT DOCUMENTS

| | | |
|---|---|---|
| 2,502,091 | 3/1950 | Harris et al. |
| 2,784,447 | 3/1957 | Thompson et al. |
| 3,151,351 | 10/1964 | Reinke |
| 3,156,946 | 11/1964 | Moncure |
| 3,156,949 | 11/1964 | Moncure |
| 3,200,436 | 8/1965 | Moncure |
| 3,249,962 | 5/1966 | Rossnan |
| 3,253,299 | 5/1966 | Harris |
| 3,274,640 | 9/1966 | Rossnan |
| 3,302,236 | 2/1967 | Harris |
| 3,325,856 | 6/1967 | Pack |
| 3,495,293 | 2/1970 | Tolley |
| 3,596,310 | 8/1971 | Tolley |
| 4,073,041 | 2/1978 | Dans et al. |

*Primary Examiner*—Willie G. Abercrombie
*Attorney, Agent, or Firm*—Thomas E. Beall, Jr.

[57] ABSTRACT

A central twin or single chain conveyor with abutments moves crabs through a centering device, beneath leg hold-downs and into an intersecting chain having projections that strike the carapace's leading edge to pivot it away from the crab body, and into a guide that, with the chain carrying the projections, will transport the carapace to a cross conveyor for removal. A central pipe, closed at its upstream end, is stationarily positioned to enter the body cavity and remove the viscera from the crab body, and travels in the body cavity while cleansing liquid is sprayed through holes in the pipe to clean the body cavity and the crab is guided by the pipe. Rotatably driven brushes biased into the crab body will, along with the water sprayed, remove the gills. The central conveyor has link support surfaces on opposite sides of a central plane of symmetry to space the crab body above the central portion of the chain so that a central rotating saw may saw the crab body into two sections, each with the legs attached. Thereafter, biased pivoting shoes press each crab section against a stationary concave guide surface to rotate the crab section as the legs are being sawed from the body section along an arcuate cut line, aided by the central chain that pushes the body into the saw, permitting the legs to lag slightly behind, until half the legs are severed. The central chain drops and the pair of outer chains pushes the remaining legs through the saw, permitting the body to lag.

32 Claims, 14 Drawing Figures

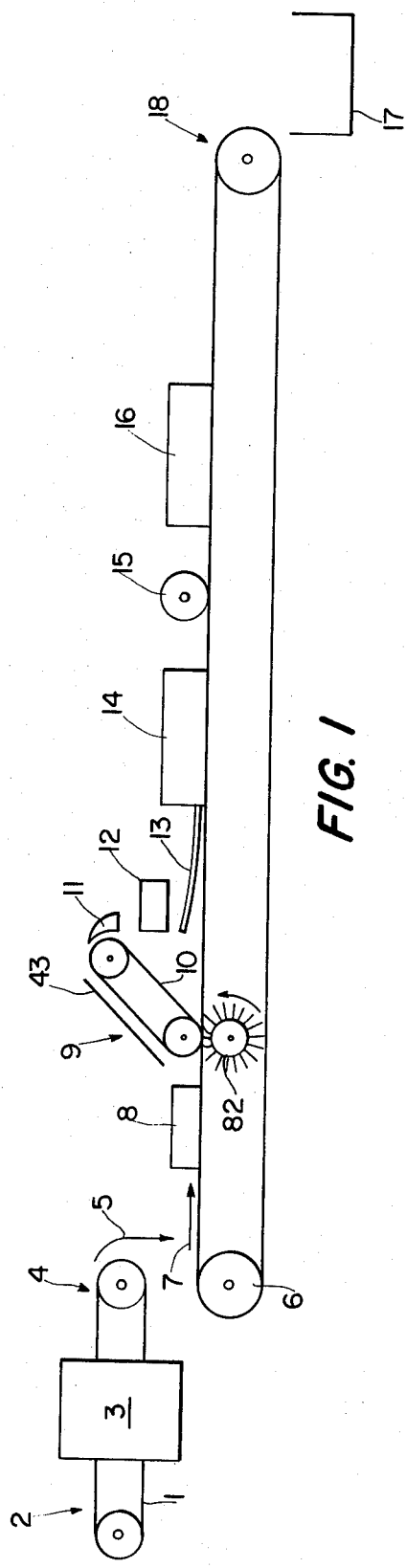
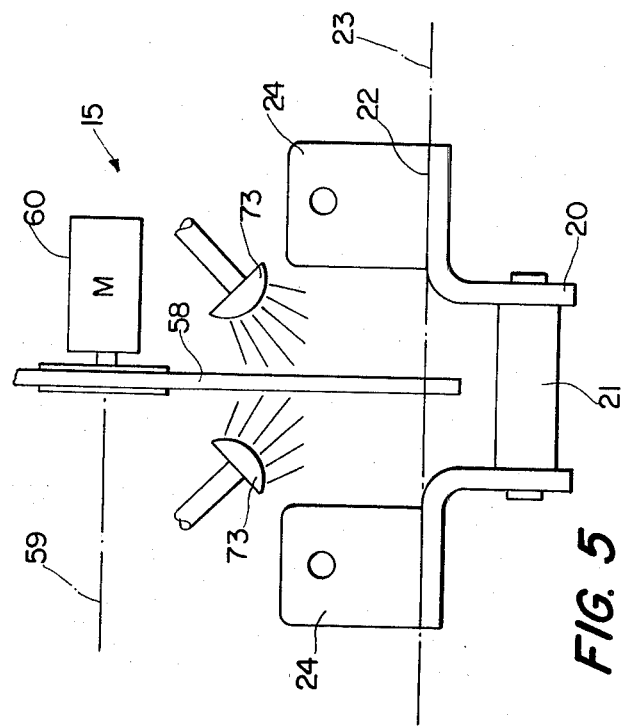
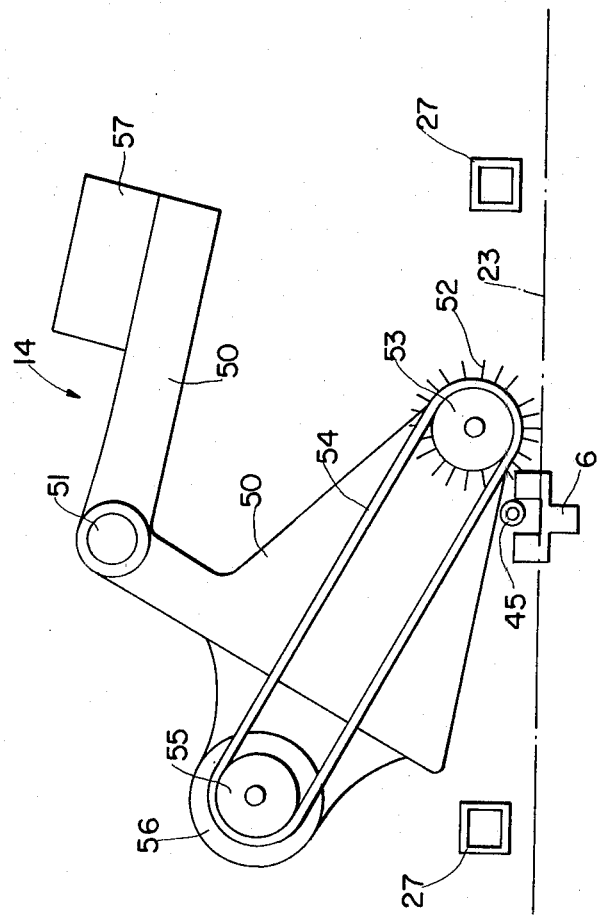
FIG. 1
FIG. 5
FIG. 4

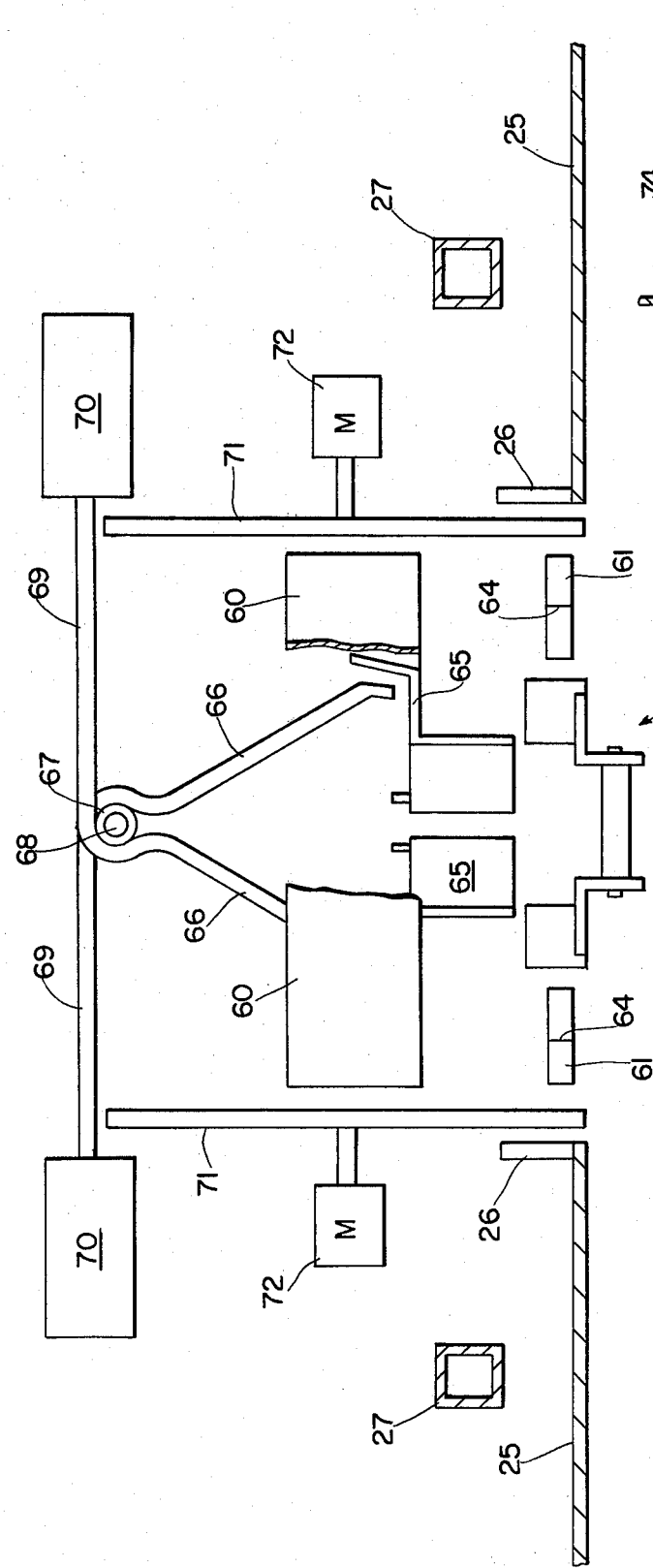
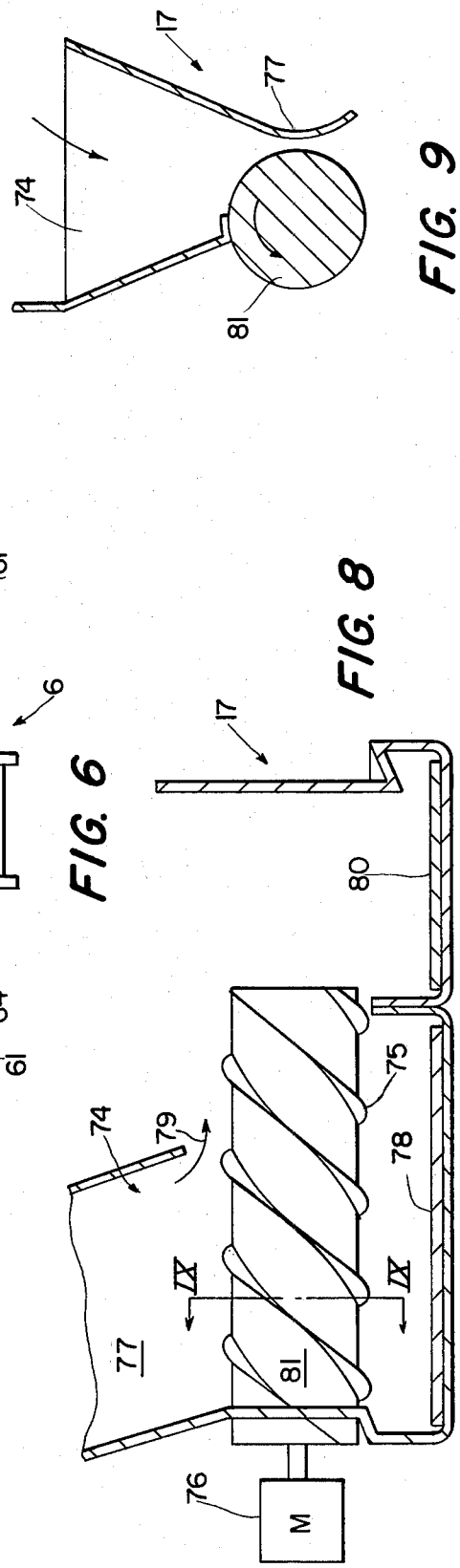
FIG. 6
FIG. 8
FIG. 9

CRAB BUTCHERING MACHINE

BACKGROUND OF THE INVENTION

The present invention relates to crab butchering apparatus or crab cleaning apparatus.

There are problems that are specifically encountered with the types of crabs known as Snow (or Tanner) and King Crab. The legs of these crabs are long and slender, tapered toward the tip, with the exception of the pincers. The pincers on the Snow crab are virtually the same size as each other and are larger in diameter than the other legs. The King crabs are substantially larger than Snow crabs and there is quite a little disparity between the left and right pincer size and the leg size. Hence the machine for King crab must be substantially larger than that for Snow crab but (omitting the pincer separator which will not work on King crab because of the pincer size disparity) otherwise identical. Unlike the King, Snow "tails" have no meat and must be removed and disposed of. One problem confronting the processor of crabs in general is that the crabs must still be alive when processing begins. Live crab butchering is required because toxins build up in crab bodies after death and with the practice of "live tanking" (that is, holding crabs alive in a tank by pumping fresh seawater through the tank) there is no way of determining how long a crab has been dead or what conditions might have occurred which would affect the level of toxins.

Consequently, in the industry, butchers handle live and moving crabs. The butcher must: grasp the crab, separate it from the others while it often has a hold on another crab, corral all of the legs so that he can butcher and clean the crab adequately, (that is, knock the carapace off, brush the gills off, shake the guts out, and split the body into sections), and place the sections on a transfer belt or the like. While a practiced butcher can accomplish these steps rather quickly, one butcher must still accomplish all steps. Subsequently the legs are normally sawed from the bodies and separated from the pincers.

When a crab butchering and cleaning machine is considered, all these steps must still be performed so that substantially the same ends are accomplished. Some type of firm hold is required and an additional problem arises when removing the back or carapace. The pincers tend to fold in towards the mouth when the carapace is removed and if a saw is used by the machine in a subsequent operation, damage to the pincers can result if they are not kept in a spread-out position.

Processing can be accomplished in two types of processing lines: the first type of processing line involves a section line, wherein the carapace is removed, the guts and gills cleaned and removed from the crab, thereafter the crab body is halved so as to leave the final product of two body halves, each with attached legs and pincers. The second type is a meat line, wherein the above processing is substantially the same and in addition the legs are removed from the body, so that the individual legs may thereafter be rolled to extrude the meat from the legs from the hole where the legs were removed from the body without tearing or "splitting" the meat. Generally speaking, the larger the size of a single piece of meat, the more valuable it is per pound. Thus, the merus segment (i.e., the large leg segment next to the body) is potentially the most valuable segment on these types of crab. Therefore, the legs are separated from the body with an eye for the optimum recovery of the merus, so that the cut should be made as close to the body as possible to obtain the greatest length of the merus, but sufficiently far from the body to provide an adequately sized hole for the above-mentioned extruding. After the legs are separated from the body, they are partially cooked and then fed into a roller for the removal of the meat. Bodies are also cooked and rolled to remove meat. This is normally not done on the same equipment as the legs. Pincers are usually handled and sold separately.

From the above, it can be seen that a butchering machine should be capable of: (1) a feeding method to easily deal with a live crab; (2) detaching carapaces and removing them; (3) detaching tails and removing them; (4) removing the guts and gills from the body; (5) producing legs and bodies cut for optimum merus meat recovery; (6) producing claws with minimum damage so the processors have all marketing options intact; (7) isolating the three components (bodies, legs and claws) to facilitate separate handling and processing; (8) producing sections only in the event that sections are called for; and accomplishing all of the above in a fast, efficient manner with maximum automation and minimum cost, both initially and with respect to running the machine.

To feed a machine such as that of the present invention, a live crab would be tossed into a conventional "kill box" facing in the direction of travel, where it would be rapidly killed by steam or some other method after several seconds of exposure and thereafter delivered quickly into the entrance of the butchering machine, so that the crab is alive when processing is initiated but handling problems caused by the crabs movements are substantially reduced.

SUMMARY OF THE INVENTION

It is an object of the present invention to provide an apparatus that will perform the above-mentioned functions and produce the above-mentioned desirable results, particularly with respect to the mentioned types of crabs that have most of their meat in their legs, although features of the present invention are also useful with any type of crab.

A pair of chains or a central chain conveyor with positive drive lugs moves crabs through a centering device, beneath leg hold-downs and into an intersecting chain having projections that will strike the carapace's leading edge to pivot the carapace backwards in a direction opposite to the conveying direction, upwards away from the crab body, and into engagement with a guide that, in cooperation with an endless chain carrying the projections, will transport the carapace to a cross conveyor or chute where it will be deposited for removal. A central pipe, closed at its upstream end, is stationarily positioned to enter the body cavity and remove the viscera from the crab body, thereafter the stationary pipe travels in the body cavity as the crab body moves along the conveying path, during which cleansing liquid is sprayed through holes in the pipe to clean the body cavity. Thereafter, rotatably driven brushes biased into the crab body will, along with the sprayed cleaning liquid, remove the gills. The central drive conveyor is provided with links that have support surfaces on opposite sides of a central plane of symmetry to space the crab body above the central portion of the chain so that a central rotating saw may saw the crab body into two sections, each with the legs attached. Thereafter, biased pivoting shoes press each crab section against a stationary concave guide surface so as to rotate the crab section as the legs are being sawed from the body section along an arcuate cut line.

BRIEF DESCRIPTION OF THE DRAWING

Further objects, features and advantages of the present invention will become more clear from the following detailed description of a preferred embodiment shown in the accompanying drawing, wherein:

FIG. 1 is a schematic side elevation view of the apparatus according to the present invention;

FIG. 4 is a view, looking in the direction of conveying with portions removed, of the device for removing the gills;

FIG. 5 is a view taken on a plane parallel to FIG. 4 of the body splitting or sawing device;

FIG. 6 is a view taken on a plane parallel to FIGS. 4 and 5, but viewed in the direction counter to the direction of conveying, of the device for removing the legs and pincers from the crab body;

FIG. 8 is a cross-sectional view of the device for separating the severed pincers and legs, taken on a vertical plane parallel to the direction of conveying;

FIG. 9 is a partial cross-sectional view of the device shown in FIG. 8 taken along line IX—IX;

DETAILED DESCRIPTION OF A PREFERRED EMBODIMENT

Figure 2:
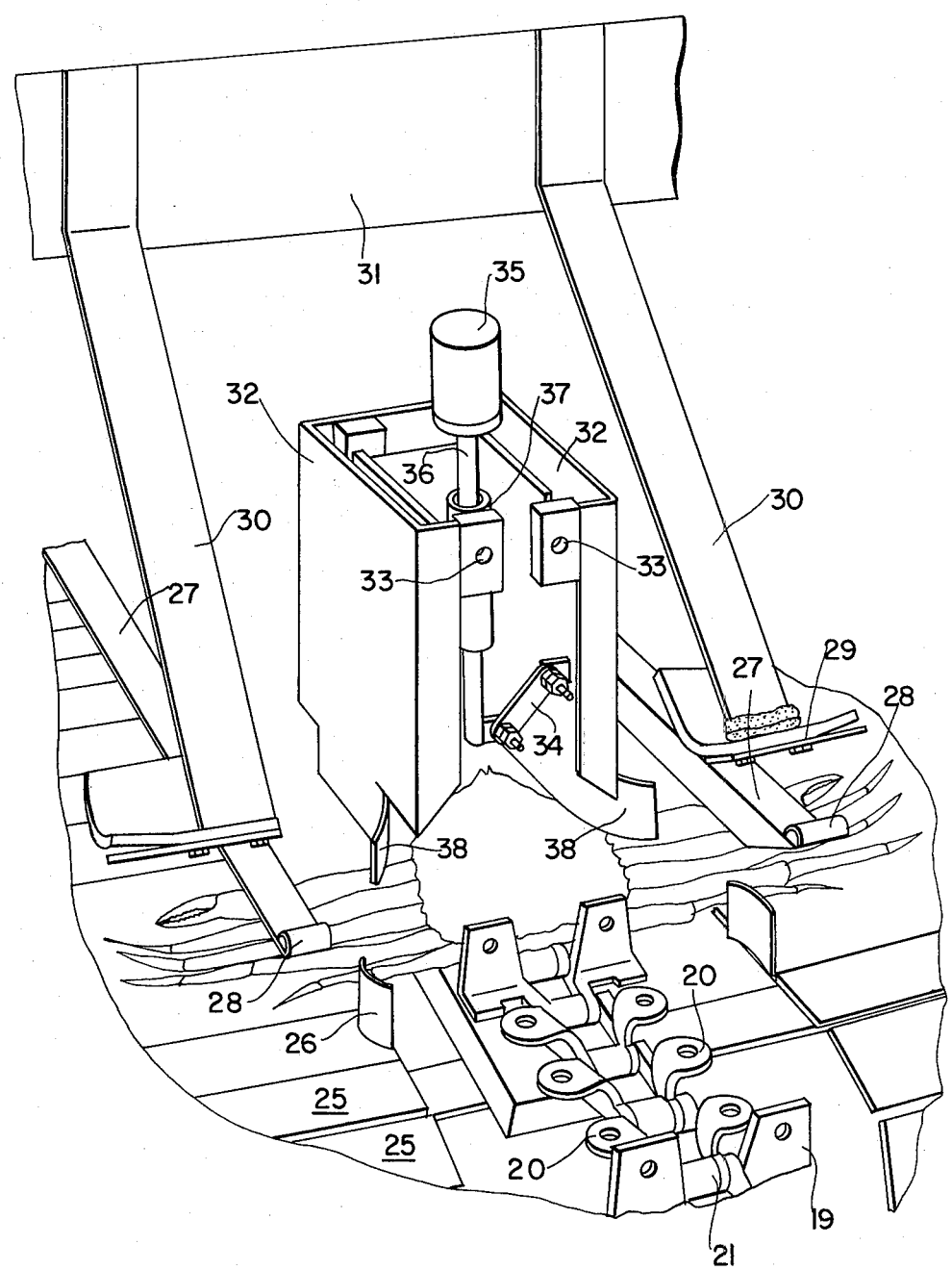
FIG. 2 is a perspective view looking in the direction of conveying showing the centering device of the machine.

As shown in FIG. 1, crabs to be butchered and cleaned are placed upon an endless conveyor belt 1, whose top surface moves from left to right, at station 2, so that they pass through a kill box 3. The kill box 3 is preferably a bath of hot water into which the conveyor belt dips for a few seconds to kill the crabs quickly, or a steam chamber for killing the crabs. After a few seconds in the kill box 3, during which they are killed and become limp, the crabs leave the exit end 4 of the conveyor 1 and drop through path 5 onto an endless conveyor 6. The crabs are manually arranged so that the carapace faces upwardly away from the conveyor 6, the head of the crab faces in the conveying direction 7 from left to right, and the legs are smoothly laid out to extend substantially co-planar from the crab body. It is also contemplated that this orientation may be accomplished automatically.

Although the crabs have already been killed in the box 3, they are so freshly killed that the present machine complies with "live" butchering requirements and in fact works equally well with live crabs, except for the difficulty of arranging the crab legs beneath leg hold down means to be described hereinafter.

The crabs enter a centering device 8 where they are laterally shifted on the conveyor 6, if needed, so that they will be symmetrically arranged with respect to a central vertical plane of symmetry of the conveyor 6.

After leaving the centering device 8, the crabs move through a device 9, which removes the carapace of each crab, so that the carapace is thereafter moved up a conveyor 10, and stripped from the conveyor 10 by a wedge shaped stationary unloader 11 that has fingers that will extend beneath the carapace as it is discharged from the conveyor 10 to guide the carapace by gravity down an inclined surface to where it will fall upon an endless conveyor 12, or chute, which will laterally move the carapace to a disposal site remote from the plane of symmetry. The conveyor 12 is an endless belt conveyor extending horizontally and substantially perpendicular to the conveyor 6. The crab bodies continue along the conveyor 6 in the conveying direction 7 to where a device 13 will enter the now exposed body cavity of the crab to remove the viscera and cleanse the body cavity with cleaning liquid spray. Thereafter, the crab body enters a device 14 having brushes and cleaning liquid jets that will remove the exposed gills from the crab body. Thereafter, a circular saw 15 will split the crab body into two body sections by cutting along the plane of symmetry through the crab body. Thereafter, each crab body section will pass through device 16, which will cut the legs and pincers from the crab body. Thereafter, the legs and pincers will move into a separation device 17 that will separate the pincers from the legs; the crab bodies, sectioned and without legs or pincers, are exited below the end of device 16 and may be conveyed to the desired location.

Figure 10:
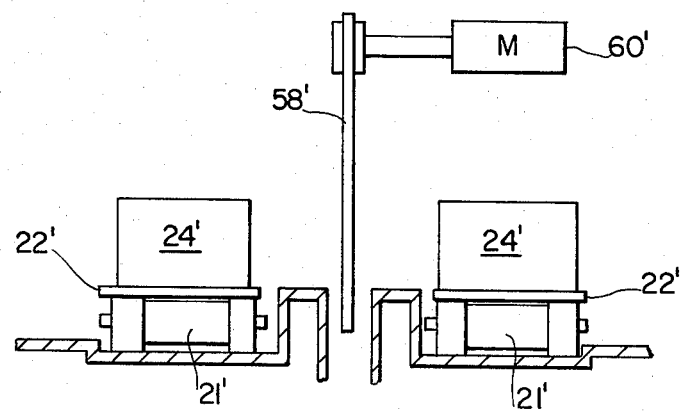
FIG. 10 is a view similar to FIG. 5, but of a modification.

When dual chains are used as shown in FIG. 10, a tail removing brush 82, rotatably driven as shown in FIG. 1, may be used.

At times, it is desirable to market the body sections with the legs attached, and then the leg removing mechanism 16 is disabled or removed from the assembly line.

As shown in FIG. 2, the conveyor 6 may be a single endless belt conveyor having three sections, or in fact three separate belt conveyors that are parallel and in fixed relationship with each other. A first conveyor portion comprises an endless chain made up of abutment links 19, support links 20 and pivot pins 21. A plurality of support links 20 are serially arranged between adjacent abutment links 19. As more clearly shown in FIG. 5, each of the support links 20 is composed of two mirror image halves, which have vertical flange portions connected to adjacent pins and horizontal flange portions that have a top support surface 22 that during the top conveying run of the conveyor 6 form and lie in a common support plane 23, which is considerably spaced above the pins 21. Two parallel chains, each with its own link pins 21, abutments links having flanges 24, and support links with surfaces 22, with spacing as indicated by abutment links of FIG. 2 between the chains would be preferred, as shown in FIG. 10, to run in channels, respectively, of a stationary table top. The abutment links 19 are substantially the same construction as the support links 20, but in addition having upstanding abutment flanges 24 that extend above the support plane 23 for engaging the rear or tail end of the crab, particularly the rear end of the crab carapace and the rear end of the crab body so as to positively drive the crab through the apparatus. On each side of the first central chain conveyor, the conveyor 6 is also provided with respective belt conveyors made up of a plurality of pivotally interconnected slats 25, (FIGS. 2, 6, 7), whose top support surfaces also extend in the common support plane 23, or closely thereto, for supporting the legs and pincers of the crab.

At spaced intervals, some of the links 25 carry upstanding crab leg engaging abutments 26 that are in fixed relationship with the abutments 24 for positively holding the crab legs in position on the slats 25, as well as aiding in the arcuate cut to be described later.

As the crabs enter the crab centering device 8, the legs move beneath respective parallel stationary rails or guides 27 that have upwardly flared entrance ends 28 that will guide the crab legs beneath them as the conveyor 6 moves the crabs in the conveying direction 7. These rails 27 extend for substantially the full length of the conveyor 6, and they are resiliently urged downward by their own weight and suitable support means, such as a sheet rubber suspension comprising a length of rubber or other flexible spring-like material 29 that is connected at its rear end to the rail 27 and its forward end to a rigid metal support strap 30, which support straps 30 are connected to a stationary frame member 31.

As shown in FIG. 2, the centering device 8 includes two mirror image brackets, which are, in this instance, formed of channel shaped sheet metal 32, which brackets are pivoted about their upper ends respectively about parallel stationary pivot pins 33, which are also parallel to the conveying direction 7. A toggle linkage interconnects the two brackets 32 so that they will move simultaneously and symmetrically with respect to the plane of symmetry about their pivot pins 33, and the toggle linkage includes links 34, each of which is connected at its outer end to its respective bracket and at its inner end to the other link 34. A weight 35 is connected by means of a vertical rod 36, which preferably passes through a stationary guide bearing 37 so that in turn its lower end is pivotally connected to the inner ends of the links 34 to thereby bias the brackets 32 so that they will be biased to pivot inwardly at their lower ends. At the lower ends of the brackets 32, each bracket is provided with an arcuate guide plate 38 that is convex inwardly so that its leading end flares laterally outward to engage the carapace and body of a crab, above the legs, and move the crab to a centered position as the crab is driven by the conveyor 6 between the brackets 32.

Figure 3:
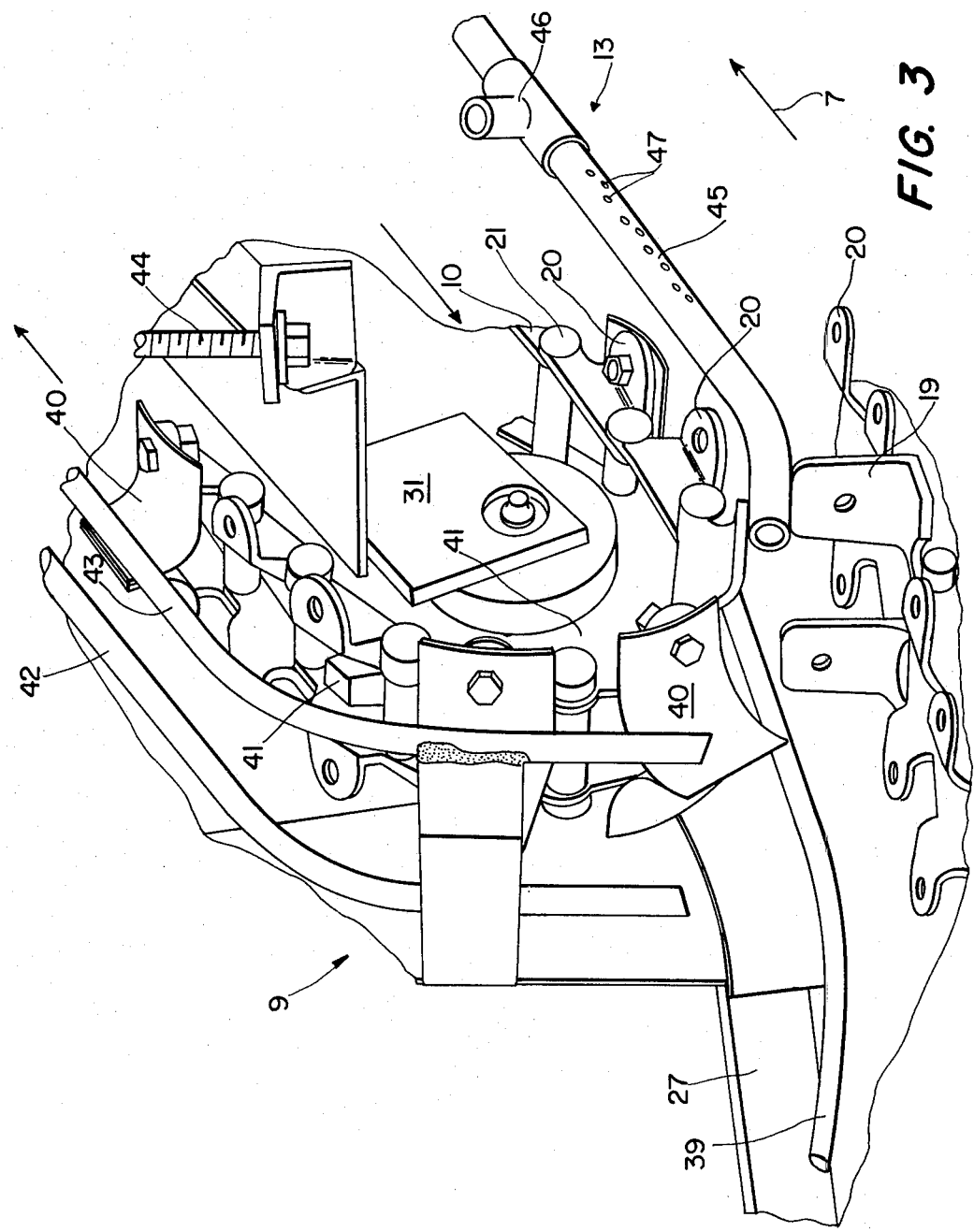
FIG. 3 is a perspective view, generally looking in the direction of conveying, of the devices for removing the carapace and viscera of crabs.

As the crab enters the device 9 for removing the carapace or back from the crab, as best seen in FIG. 3, supplemental guide rails 39 (only one being shown), which have a flared entrance end and comprise a bent rod, each biased to move inwardly and downwardly to adjust to crab size, will tightly engage the crab legs immediately adjacent the crab body and carapace, on each side of the plane of symmetry. Each rod 39 is mounted on a vertical rod that passes through a bushing to permit vertical movement. The bushing is mounted on a swivel to permit lateral movement. Both types of movement are biased as stated and limited by stops. The rods 39 in addition to the leg hold down guides 27, together tightly hold the crab body against the conveyor 6. Preferably, the conveyor 10 comprises a chain composed of the same support links 20 that are used in constructing the chain 6, together with link pins or pivot pins 21. At a plurality of evenly spaced locations, a metal abutment 40 is rigidly secured to one of the support links 20. The abutment 40 may be V-shaped as shown or square or any other shape so long as it fits between the abutment flanges 24 of conveyor 6. In FIG. 3, the conveyor 6 is driven from left to right, while the conveyor 10 is driven in the clockwise direction in fixed timed relationship with the conveyor 6, preferably at the same speed. The abutments 19 and the projections 40 are so spaced and the conveyors 6 and 10 so timed that as the conveyor 10 moves through its semicircular transitional run about the sprocket 41 pivotally carried on frame 31, the projection 40 will travel in an arc that will intersect a crab being carried by the adjacent abutments 19 so that the projection 40 will pass closely adjacent but spaced from the crab body and strike the carapace upwardly on its leading edge to quickly tear the carapace from the crab body and move it upwardly to substantially pivot about its rear end that is held by the abutment 19. The blow struck by the projection 40 is substantial since the projection 40 is moving through an arc and thereby the outer end of the projection 40 will have an increased speed and be moving in a direction opposite to the movement of the conveyor 6. The conveyor 10 has upper and lower parallel runs, and an opposite end sprocket 41' similar to 41 that will be driven by a suitable motor means. As the carapace is lifted upwardly by the projection 40, after it has been separated from the crab body that continues on the conveyor 6, the carapace will move between the conveyor chain 10 and a guide comprised by parallel stationary bar rails 42, 43, which will hold the carapace on the conveyor 10 until the carapace reaches the opposite semicircular transitional run of the conveyor 10 where the carapace will move on top of unloader 11 having a downwardly slanted surface with fingers that will move beneath the carapace and guide the carapace by gravity onto a chute or the conveyor 12 that will run perpendicular to the conveyor 10 for removing the carapace to a disposal location. The spacing of the conveyor 10 from the conveyor 6 is controlled by an adjustment support rod 44 that supports the portion of the frame 31 that provides the bearing for the sprocket 41, which rod 44 is threaded and thereby provides for vertical adjustment.

After the carapace is removed from the crab body, the crab body continues to be moved forward by the abutments 19 of the conveyor 6 to where the flared inlet end of a rod 45 will enter the body cavity. The rod 45 is preferably a bent stationary tube that is within the plane of symmetry and has its inlet end plugged. The inlet end will engage the viscera within the body cavity and push the viscera from the body cavity. A cleaning liquid inlet coupling 46 provides pumped cleaning liquid, preferably water, to the hollow interior of the tube 45, from which it will be ejected in sprays through a plurality of nozzles or holes 47 suitable spaced along the length of the tube 45. The water spayed from the holes 47 will clean the body cavity and adjacent portions of the crab body.

While still engaged by the cleaning tube, the crab body enters the device 14 for removing the gills. The device 14 consists of two parts that are mirror images of each other, spaced adjacent each other in the direction of conveying, and symmetrically arranged with respect to the central plane of symmetry, so that only one will be described in detail in FIG. 4 to operate on one side of the crab body to remove one of the gill sets, with it being understood that the other will remove the other of the gill sets. As shown in FIG. 4, a bracket 50 is pivotally supported on a stationary bearing 51 for pivoting movement in a plane that is preferably perpendicular to the conveying direction. A brush 52 is rotatably mounted on the bracket 50 for rotation about an axis spaced from the bearing 51 and substantially parallel to the direction of conveying and in a location where the brush 52 will engage the gills on one side of the crab body as it is moved by the conveyor 6, with the tube 45 holding the body centered and additionally providing jets of cleaning liquid that will assist the brush in removing the gills from the crab body. A pulley 53 is drivingly connected to the brush 52 and driven by a belt 54 that is in turn driven by a pulley 55 that is drivingly connected to motor 56 mounted on the bracket 50. A counterweight 57 is provided for the motor 56, so that the entire assembly is slightly biased to rotate in the clockwise direction about the bearing 51 and bias the brush 52 into engagement with the crab body.

After the gills have been removed, the crab is moved by the conveyor 6 to the device 15 for splitting the crab body into two equal sections. This device is shown in FIG. 5, and comprises a disc saw blade 58 supported for rotation about a fixed horizontal axis 59 that is perpendicular to the plane of symmetry, so that the saw blade 58 is within the plane of symmetry and driven by a suitable motor 60. As mentioned previously, the crab body is supported on the support plane 23. Since the support surfaces of the links 19, 20 and the abutments 24 are spaced on respective sides of the plane of symmetry, there is no structure of the conveyor 6 within the immediate vicinity of the intersection of the plane of symmetry with the support plane 23; therefore the saw blade 58 may extend to intersect the support plane 23 and still be spaced above the pivot pins 21 so that the saw blade 58 will cut the crab body into two sections along the plane of symmetry without interferring with the conveyor 6. With the dual center chains of the FIG. 10 variation, the saw blade 58' driven by motor 60' does not require any critical spacing. The tube 45 has its downstream terminal end spaced immediately upstream from the saw blade 58, so that the crab body is still centered when it enters the device 15. During the sawing, the debris is removed by cleaning liquid sprayed from nozzles 73.

Figure 7:
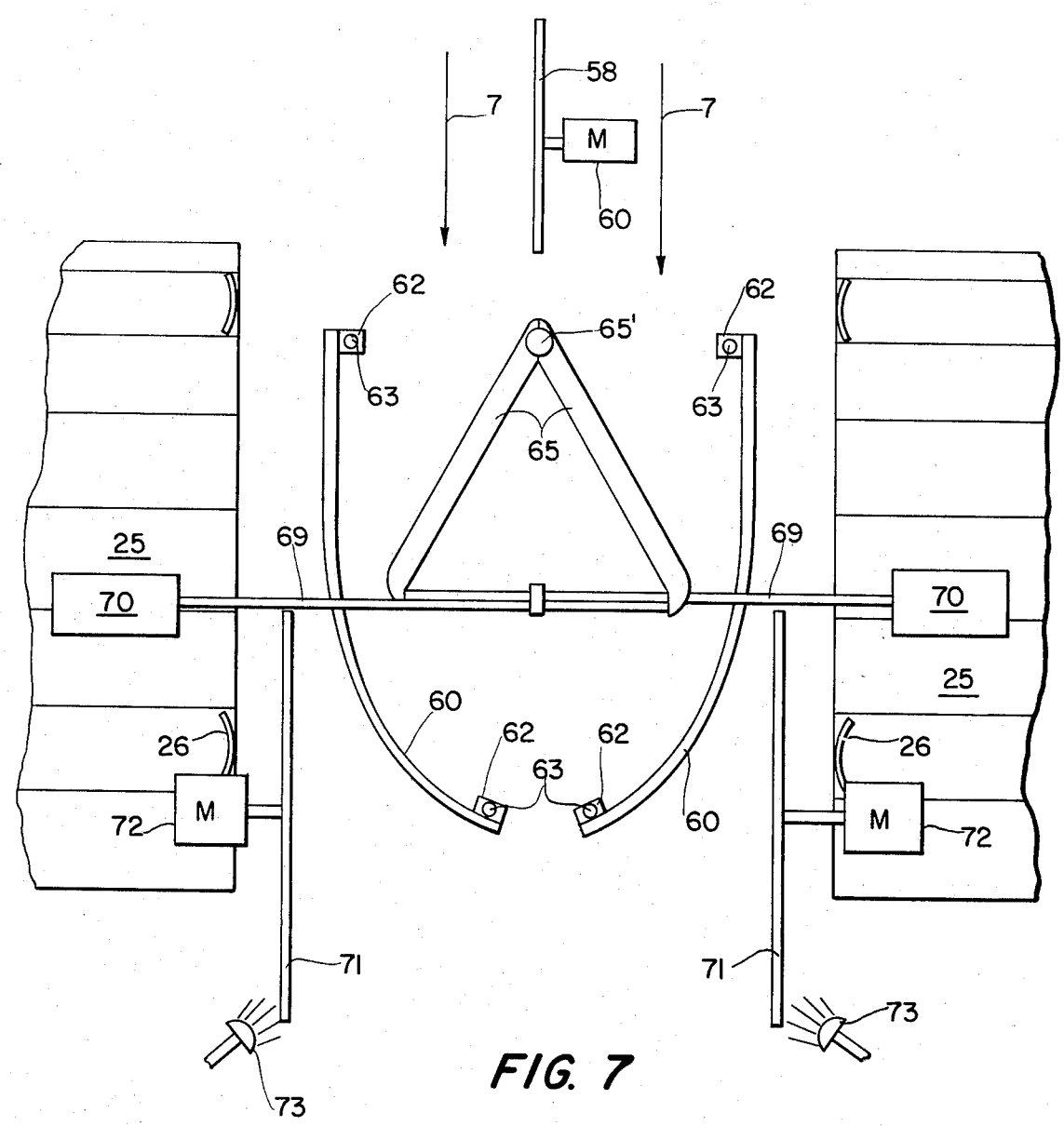
FIG. 7 is a top view of the device shown in FIG. 6.

The device 16 for removing the crab legs and crab pincers from the crab body is specifically shown in FIGS. 6 and 7, with portions removed for clarity, particularly the conveyor 6 is not shown in FIG. 7. FIG. 6 is a view from the rear of the machine, that is the crabs are moving towards the viewer in FIG. 6. In FIG. 7 the crabs are moving from top to bottom. The crab bodies or crab body sections, with attached legs and pincers, being supported by and driven by the conveyor 6, will enter between opposed pairs of upper 60 and lower 61 stationary arcuate guides. The upper guides 60 are mirror images of each other and formed of bent sheet steel having securement tabs 62 stationarily supported by threaded rods 63 for vertical adjustment. The lower stationary guides 61 are mirror images of each other and stationarily supported by similar means (not shown) so that they are vertically aligned with the corresponding upper guides 60, except that the lower guides 61, although starting at the same upstream location as the upper guides 60, do not extend as far rearward as the upper guides 60, and have their terminal downstream ends 64 considerably spaced from each other so that the legless bodies may freely drop downwardly away. A pair of mirror image movable guides 65, having a uniform cross-sectional shape that is shown in FIG. 6 throughout their length are substantially straight, extend substantially horizontal, and have their upstream ends pivotally supported about a substantially vertical stationary pivot pin 65'. These movable guides 65 are biased outwardly towards the stationary guides 60, 61 by means of two mirror image biasing devices. Each biasing device comprising a bent rod having its lower end 66 abutting the corresponding movable guide 65 closely adjacent its downstream end, its middle portion bent around and secured to a bearing sleeve 67 that is rotatably mounted on a stationary pin 68, and its opposite end 69 provided with a biasing weight 70. As each crab section moves between its respective stationary guides 60, 61 and movable guide 65, it will pivot being pulled by lugs 26 and following the arc of the stationary guide 60, 61, to which it is pressed by the movable guide 65. As the crab body section pivots, the legs will be cut from the crab body section by a saw disc or blade 71 that is mounted for rotation about a horizontal axis perpendicular to the plane of symmetry, and which is further driven by a suitable motor means 72. In this way, the cut line between the legs, pincers and the crab body is arcuate, as shown in FIGS. 11–14.

Figure 11:
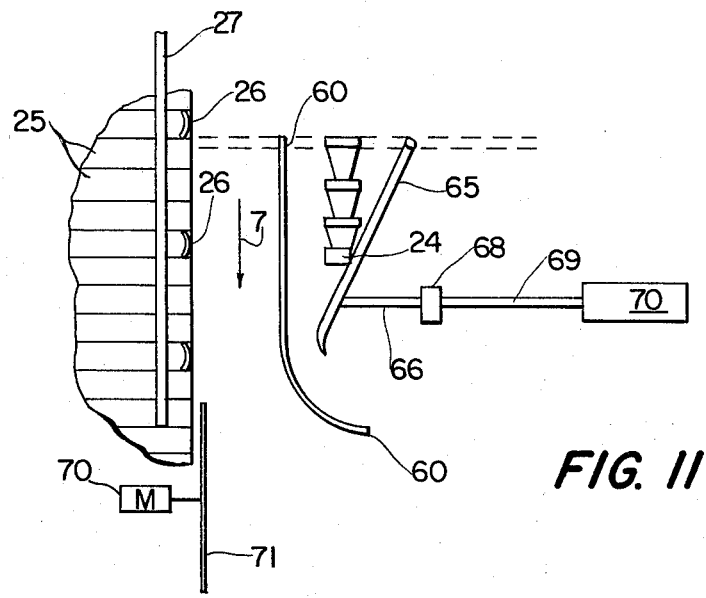
FIGS. 11, 12, 13 and 14 are plan views of the left hand portion of FIG. 7, showing the progressive cutting of the pincers and legs of a crab section as it moves through the device, sequentially.
Figure 12:
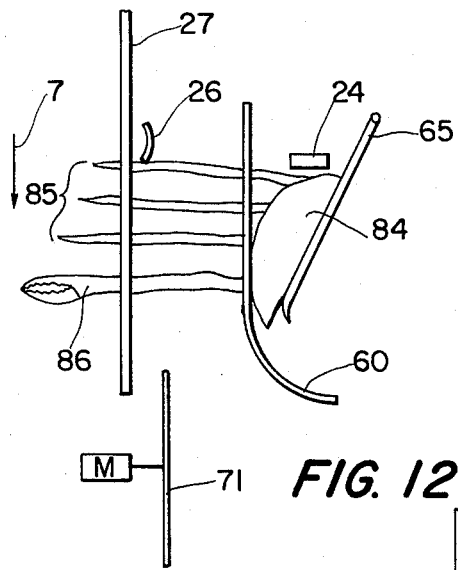
Figure 13:
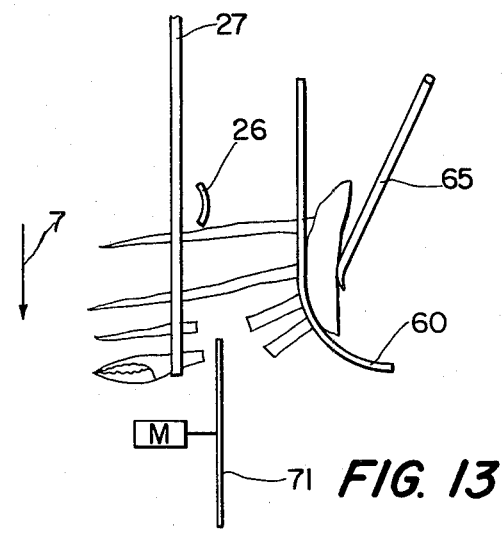
Figure 14:
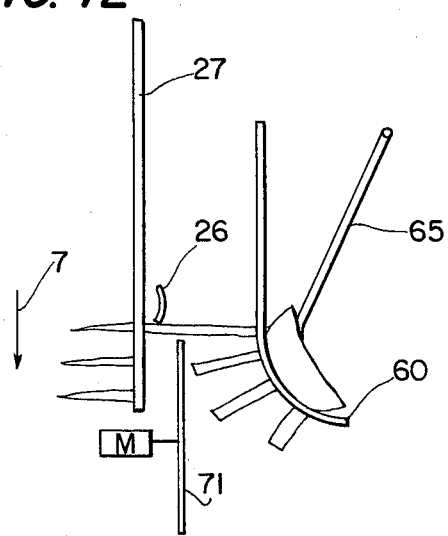

As shown in FIG. 11, the left hand portion of FIG. 7, are illustrated the approximate proportions and alignment of the devices, although the devices are not to scale; as to relative positions, it is noted that the abutments 24 are respectively laterally even with or slightly ahead of the lugs 26, and the device is ready to receive one crab body section. In FIG. 12, the crab body 84 is being engaged by the guide 65 along substantially its entire straight central cut line that was formed by the saw 58 as it is being driven by the abutment 24, and the opposite side of the crab body is being held against the stationary guides 60, 61 so that the crab legs 85 and pincer 86 will extend between the vertically aligned stationary guides 60, 61, beneath the stationary rail 27 and be moved in the conveying direction 7 by the lug 26. As the crab body continues to move forward, in the conveying direction 7, the pincer 86 is first cut off and then the legs 85 are sequentially cut off as shown in FIGS. 13 and 14, while the arcuate portion of the stationary guides 60, 61 will pivot the crab body so as to produce a correspondingly arcuate cut line where the pincer and legs are cut from the crab body.

For all of the saw blades 71 and 58, as shown in FIGS. 5 and 7, nozzles 73 for spraying streams of cleaning liquid upon the crab parts being sawed are provided adjacent the saws to remove the dust or debris caused by sawing.

The device 17 for separating the legs 85 from the pincers 86 is shown in FIGS. 8 and 9. After they have been sawed from the body, the pincers and legs fall together into a hopper 74, onto a cylinder 81 rotatably mounted about a horizontal axis that may or may not be substantially parallel to the direction of conveying 7, which cylinder has one or more upstanding helical conveying ridges 75. The cylinder 81 is driven by a suitable motor means 76. Since the legs are smaller than the pincers, the legs will pass between the cylinder and a wall 77, to fall downwardly onto a belt conveyor 78 that will move the legs horizontally in a convenient direction. Since the pincers are wider or thicker than the spacing between the cylinder and the wall 77, they will be conveyed in the direction of arrow 79 by means of the ridges 75 to where they will fall off the end of the cylinder onto another conveyor 80, which is a belt conveyor separate from the belt conveyor 78. The conveyor 80 will horizontally move the pincers to a desirable location separate from the legs.

The body or body sections, from which the legs have been removed, will fall off the central end of the conveyor 6 immediately after the leg saws and onto a suitable conveyor or container separate from the remaining crab portions.

Since the operation of the machine has been described along with its structure, it will not be repeated.

In conjunction with the tube 45, it is contemplated that a soft bristled brush located in the plane of symmetry and rotated about a horizontal axis perpendicular to the plane of symmetry may be used. The brushes used for removing the gills are preferably stiff bristled or provided with wire bristles. It may be desirable to provide separate sprays adjacent all of the brushes, with the sprays being provided by spray heads similar to the ones 73 previously mentioned.

While a preferred embodiment of the present invention has been described in detail, for purposes of illustration of the general principles and specific and desirable structure, further embodiments, variations and modifications are all contemplated according to the spirit and scope of the following claims.

What is claimed is:

1. A cleaning machine for crabs having a body, gills, viscera in a body cavity, legs, tail, carapace, and pincers, comprising:

first endless conveyor means having a plurality of crab body engaging abutments spaced along its length for positively driving crabs along a conveying path in a conveying direction with their eyes facing in the conveying direction and their carapaces facing away from said conveyor means;

second endless conveyor means having a plurality of rigid projections;

means for mounting said second conveyor means for movement in a projection path substantially co-planar with said first conveying means so that said projection path intersects the conveying path of said first conveyor means;

means for driving said second conveyor means so that said abutments and said projections respectively in said conveying path and projection path have their movement timed with respect to each other so that a crab engaged by said abutments and being driven along said conveying path will have its carapace's leading edge struck by one of said projections of said second conveyor means to break said carapace away from the crab body, drive the carapace in a pivoting relationship with respect to the tail end of the carapace backward and away from said conveying path as the crab body moves in the conveying direction.

2. The crab cleaning apparatus of claim 1, wherein said first conveyor means includes an endless chain and said second conveyor means includes an endless chain; and said drive means includes respective driven sprockets driven with respect to each other in a fixed speed relationship and positively interengaging respective chains.

3. The crab cleaning apparatus of claim 1, further including stationary carapace guide means extending along the projection path of said second conveyor means for engaging the carapace on the opposite side from said projections, holding the carapace against said projections and together with said projections forming means for conveying the carapaces bodily away from the crab bodies to a disposal station remote from said first conveyor means.

4. The crab cleaning apparatus of claim 1, including a first guide centering means separate from and on one lateral side of said conveying path and a second guide centering means on the lateral opposite side of said conveying path; means mounting said centering means for movement laterally toward and away from each other and said conveying path; means biasing said centering means towards said conveying path; and said centering means having inlet guide surfaces opening laterally outwardly towards the conveying direction and spaced divergingly from each other, so that said centering means will engage the sides of crab bodies being moved along said conveying path and center said crab bodies immediately prior to said projections striking the carapace of the centered crab body.

5. The crab cleaning apparatus of claim 1, wherein said second conveyor means includes an endless chain having opposed parallel runs and opposed semicircular transitional runs; one of said transitional runs being immediately adjacent said first conveying means and moving said projections in the projection path for striking the crab carapace of the crab being carried by said first conveying means, and said conveying means being driven so that the carapace struck and removed along the first semi-circular run is thereafter conveyed along one of the parallel runs of said second conveyor moving along a carapace moving direction co-planar with, substantially in the same general direction with and forming an acute angle with said conveying direction.

6. The crab cleaning apparatus of claim 5, including third endless conveyor means moving in a closed loop contained within a plane intersecting the common plane of said first and second conveyor means, including two opposed parallel conveyor runs, one of which is immediately adjacent and beneath the second semicircular transitional run of said second conveyor means so that carapaces traveling along said second conveyor are discharged by gravity onto said third conveyor means and thereafter carried by said third conveyor means laterally away from the common plane of said first and second conveyor means.

7. The crab cleaning apparatus of claim 6, further including stationary carapace guide means extending along the projection path of said second conveyor means for engaging the carapace on the opposite side from said projections, holding the carapace against said projections and together with said projections forming means for conveying the carapaces bodily away from the crab bodies to a disposal station remote from said first conveyor means.

8. The crab cleaning apparatus of claim 7, including a first guide centering means separate from and on one lateral side of said conveying path and a second guide centering means on the lateral opposite side of said conveying path; means mounting said centering means for movement laterally and symmetrically toward or away from each other and said conveying path; means biasing said centering means towards said conveying path; and said centering means having inlet guide surfaces opening laterally outwardly towards the conveying direction and spaced divergingly from each other, so that said centering means will engage the sides of crab bodies being moved along said conveying path and center said crab bodies immediately prior to said projections striking the carapace of the centered crab body; said first conveyor means includes an endless chain; and said drive means includes respective driven sprockets driven with respect to each other in a fixed speed relationship and positively interengaging respective chains.

9. A cleaning machine for crabs having a body, gills, viscera in a body cavity, legs, tail, carapace, and pincers, comprising:

first conveyor means comprising an endless chain driven in a central plane of symmetry having a crab conveying path, said chain being comprised of a plurality of drive links, a plurality of support links serially interposed between each adjacent pair of drive links, and pivot pins interconnecting adjacent drive and support links;

said support links having support surfaces on each side of the central plane of symmetry of said chain in spaced relationship from each other laterally with respect to said plane and spaced laterally in a direction parallel to said plane from the remaining structure of said support links and pivot pins within said plane for supporting crab bodies on a support plane perpendicular to said plane of symmetry and spaced outwardly from any chain structure in said plane of symmetry;

said drive links having abutment surfaces on each side of the central plane of symmetry of said chain in laterally spaced relationship from each other and spaced in a direction parallel to said plane of symmetry from said support plane for driving crab bodies on said support plane perpendicular to said plane of symmetry and spaced outwardly from any chain structure in said plane of symmetry, wherein said abutment surfaces extend outwardly from said support plane to positively engage and drive crab bodies;

means for removing the carapace from crabs as they are driven along said conveying path by said first conveyor means;

a circular saw blade generally within said plane of symmetry and spaced downstream from said carapace removing means along said conveying path and mounted so as to intersect said support plane and be spaced from all chain structure within said plane of symmetry; and means for rotatably driving said saw blade so as to cut the crab body in two symmetrical sections.

10. The crab cleaning apparatus of claim 9, further including means for centering the crabs with respect to said plane of symmetry and holding said crab body in the centered position with respect to said plane of symmetry as it passes through said saw blade.

11. The crab cleaning apparatus of claim 9, including a first guide centering means separate from and on one lateral side of said conveying path and a second guide centering means on the lateral opposite side of said conveying path; means mounting said centering means for movement laterally and symmetrically toward or away from each other and said conveying path; means biasing said centering means towards said conveying path; and said centering means having inlet guide surfaces opening laterally outwardly towards the conveying direction and spaced divergingly from each other, so that said centering means will engage the sides of crab bodies being moved along said first conveying path and center said crab bodies.

12. The crab cleaning apparatus of claim 11, linkage means interconnecting said centering means so as to maintain said centering means symmetrical with respect to the central plane of symmetry of said first conveying means at all times.

13. A cleaning machine for crabs having a body, gills, viscera in a body cavity, legs, tail, carapace, and pincers, comprising:

conveyor means for moving crabs along a conveying path in a conveying direction;

means for generally holding crabs in a centered position on said conveyor means to be carried by said conveyor means with their carapaces on the opposite sides of their bodies from said conveyor means;

means for removing the carapaces from the crab bodies as said crabs are carried along said conveyor path by said conveyor means;

stationary means mounted immediately adjacent said conveying path in spaced and centered relationship with respect to said conveying path so as to engage the body cavity of crab bodies moving along said conveying path after their carapaces have been removed so as to engage and remove viscera within said body cavity;

said stationary means extending along a substantial length of said conveying path, being hollow so as to form a liquid chamber, having inlet means for receiving cleaning liquid, and a plurality of outlet nozzles along its length, as measured along the conveying direction, for projecting streams of cleaning liquid into the body cavity of the crab body moving along said conveying path.

14. The crab cleaning apparatus of claim 13, wherein said stationary means is a tube extending parallel to said conveying path throughout a major portion of its length and having an upstream end, with respect to the conveying direction, that flares outwardly away from said conveying path for facilitating entry into the body cavity.

15. A cleaning machine for crabs having a body, gills, viscera in a body cavity, legs, tail, carapace, and pincers, comprising:

first conveyor means having a plurality of outward abutments for positively engaging crab bodies and moving them along a conveying path in a conveying direction;

means for moving a plurality of leg engaging lugs in a first path parallel to said crab conveying path and spaced laterally on one side thereof and other lugs along a second leg conveying path spaced laterally on the opposite side of said conveying path;

means for synchronously driving said crab leg engaging lugs and said crab body engaging abutments in the same conveying direction;

first and second support surface means drivingly attached to said lugs for supporting crab legs on respective sides; and parallel stationary guide rails respectively spaced above said crab leg support means surfaces along said conveying path.

16. The crab cleaning apparatus of claim 15, including means for centering said crabs with respect to said first conveyor means;

means for removing the carapace of crabs being conveyed by said first conveyor means;

first and second means for cutting the crab legs separately from each side of the crab body, and each extending between said first conveyor means and each of said first and second support surface means respectively.

17. The crab cleaning apparatus of claim 16, wherein each of said means for cutting is stationary with respect to the conveying path; and including means for swinging the crab body in an arcuate path adjacent each of said means for cutting, with the arcuate path being superimposed on the conveying path, so that the cutting means will sever the crab legs from the crab body along an arcuate cutting line with respect to the crab body that is concave outwardly of the crab body.

18. A cleaning machine for crabs having a body, gills, viscera in a body cavity, legs, tail, carapace, and pincers, comprising:

conveyor means for engaging and moving crabs along a conveying path in a conveying direction with the crab carapaces spaced on the opposite side of the crab bodies from said conveying means;

means for removing the crab carapaces from the crab bodies as they move along the conveying path;

means downstream from the carapace removing means for removing the gills from the crab body, comprising two brushes mounted for rotation about respective axes, each brush being respectively carried by a separate bracket, bearing means within said bracket for rotatably mounting the corresponding brush, a stationary frame, separate bearing means pivotally mounting each bracket on said frame for pivoting about respective pivot axes generally parallel to the conveying direction and spaced from the axis of rotation of the corresponding brush, means biasing said brackets for pivoting movement in one direction to move said brushes towards the crabs carried by said conveying means, and motor means carried by each bracket for rotating each brush, respectively.

19. A cleaning machine for crabs having a body, gills, viscera in a body cavity, legs, tail, carapace, and pincers, comprising:

endless conveyor means for driving crabs along a conveying path in a conveying direction;

means for removing the carapace from the crabs as they move along said conveying path;

means for removing the legs and pincers from the crab body after the carapace has been removed; and means receiving both legs and pincers after they have been removed from the crab body and separating the pincers from the legs, including a cylindrical drum rotatably mounted about a fixed axis, at least one helical projection on said drum, means for rotating the drum in one direction so as to provide a feed direction for legs and pincers engaged by said helical projection with the feed direction being parallel to the drum axis, a hopper receiving the severed crab legs and pincers and feeding them to the drum to be engaged by the helical projection thereon, a partition wall spaced from one side of said drum to provide a discharge aperture therebetween that is larger than the range of sizes for leg thickness and smaller than the range of sizes for pincer thickness to discharge legs to the area below said drum and feed pincers axially in relation to the drum out of vertical alignment with said area, and means for separately receiving the legs in said area and the pincers removed from said area.

20. The apparatus of claim 19, wherein said means for rotating said drum rotates said drum so that its periphery adjacent said partition moves upwardly, and said axis of rotation of said drum is substantially parallel to the direction of conveying.

21. The apparatus of claim 19, wherein said receiving means includes a first endless conveyor in said area for receiving the pincers and moving them to a desired location, and a separate endless conveyor horizontally spaced from said first conveyor and from said first area for receiving thereon and horizontally conveying the pincers.

22. A cleaning machine for crabs having a body, gills, viscera in a body cavity, legs, tail, carapace, and pincers, comprising:

endless conveyor means for moving a plurality of crabs along a conveying path in a conveying direction with their heads and tails aligned with the conveying direction;

means for automatically removing the carapaces from the crabs as they are moved along said conveying path;

means for cutting the legs from the crab body on one side of the crab body along an arcuate cutting line relative to the crab body, comprising a fixed arcuate surface stationarily mounted to one lateral side of the center of the conveying path in a position to engage the corresponding side of the crab body adjacent the legs to be cut and being concave inwardly towards the center line, resilient means for engaging the crab body on the opposite side of the crab body from said arcuate surface to hold said crab body against said arcuate surface as said crab body is moved by said conveyor means in the conveying direction to thereby pivot said crab body in an arcuate path superimposed upon the conveying path to swing a fixed point along an arcuate path relative to the crab body that intersects all of the crab legs closely adjacent the crab body, and a stationary cutter having a cutting edge at said fixed point.

23. The apparatus of claim 22, including spaced apart substantially parallel and complementary arcuate guide surfaces for engaging the same side of said crab body and receiving the crab legs therebetween.

24. The apparatus of claim 22, wherein said cutter is a cutting disc rotatably mounted about a fixed horizontal axis.

25. The apparatus of claim 24, wherein said resilient means is pivotally mounted about a fixed axis spaced from said fixed point and substantially perpendicular to said cutter axis of rotation.

26. The apparatus of claim 22, further including cutter means for splitting said crab body, after said carapace has been removed, into two symmetrical crab body sections with attached legs; and a second leg removing means substantially identical to said first leg removing means spaced on the opposite side of the center line of the conveying path as a mirror image.

27. The crab cleaning apparatus of claim 1, further including:

said first conveyor means comprising an endless chain driven in a central plane of symmetry having a crab conveying path, said chain being comprised of a plurality of drive links, a plurality of support links serially interposed between each adjacent pair of drive links, and pivot pins interconnecting adjacent drive and support links;

said support links having support surfaces on each side of the central plane of symmetry of said chain in spaced relationship from each other laterally with respect to said plane and spaced laterally in a direction parallel to said plane from the remaining structure of said support links and pivot pins within said plane for supporting crab bodies on a support plane perpendicular to said plane of symmetry and spaced outwardly from any chain structure in said plane of symmetry;

said drive links having abutment surfaces on each side of the central plane of symmetry of said chain in laterally spaced relationship from each other and spaced in a direction parallel to said plane of symmetry from said support plane for driving crab bodies on said support plane perpendicular to said plane of symmetry and spaced outwardly from any chain structure in said plane of symmetry, wherein said abutment surfaces extend outwardly from said support plane to positively engage and drive crab bodies;

a circular saw blade generally within said plane of symmetry and spaced downstream from said carapace removing means along said conveying path and mounted so as to intersect said support plane and be spaced from all chain structure within said plane of symmetry;

means for rotatably driving said saw blade so as to cut the crab body in two symmetrical sections;

means for generally holding crabs in a centered position on said conveyor means to be carried by said conveyor means with their carapaces on the opposite sides of their bodies from said conveyor means;

stationary means mounted immediately adjacent said conveying path in spaced and centered relationship with respect to said conveying path so as to engage the body cavity of crab bodies moving along said conveying path after their carapaces have been removed so as to engage and remove viscera within said body cavity;

said stationary means extending along a substantial length of said conveying path, being hollow so as to form a liquid chamber, having inlet means for receiving cleaning liquid, and a plurality of outlet nozzles along its length, as measured along the conveying direction, for projecting streams of cleaning liquid into the body cavity of the crab body moving along said conveying path;

means downstream from the carapace removing means for removing the gills from the crab body, comprising two brushes mounted for rotation about respective axes and which brushes are spaced from each other in the conveying direction, each brush being respectively carried by a separate bracket, bearing means within said bracket for rotatably mounting the corresponding brush, a stationary frame, separate bearing means pivotally mounting each bracket on said frame for pivoting about respective pivot axes generally parallel to the conveying direction and spaced from the axis of rotation of the corresponding brush, means biasing said brackets for pivoting movement in one direction to move said brushes towards the crabs carried by said conveying means, and motor means carried by each bracket for rotating each brush, respectively;

means for cutting the legs from the crab body on one side of the crab body along an arcuate cutting line relative to the crab body, comprising a fixed arcuate surface stationarily mounted to one lateral side of the center of the conveying path in a position to engage the corresponding side of the crab body adjacent the legs to be cut and being concave inwardly towards the center line, resilient means for engaging the crab body on the opposite side of the crab body from said arcuate surface to hold said crab body against said arcuate surface as said crab body is moved by said conveyor means in the conveying direction to thereby pivot said crab body in an arcuate path superimposed upon the conveying path to swing a fixed point along an arcuate path relative to the crab body that intersects all of the crab legs closely adjacent the crab body, and a stationary cutter having a cutting edge at said fixed point.

28. The crab cleaning apparatus of claim 27, wherein said first conveyor means has a plurality of outward abutments for positively engaging crab bodies and moving them along the conveying path;

means for moving a plurality of leg engaging lugs in a first path parallel to said crab conveying path and spaced laterally on one side thereof and other lugs along a second leg conveying path spaced laterally on the opposite side of said conveying path;

means for synchronously driving said crab leg engaging lugs and said crab body engaging abutments in the same conveying direction;

first and second support surface means drivingly attached to said lugs for supporting crab legs on respective sides; and parallel stationary guide rails respectively spaced above said crab leg support means surfaces along said conveying path.

29. The crab cleaning apparatus of claim 28, wherein said second conveyor means includes an endless chain having opposed parallel runs and opposed semicircular transitional runs; one of said transitional runs being immediately adjacent said first conveying means and moving said projections in the projection path for striking the crab carapace of the crab being carried by said first conveying means, and said conveying means being driven so that the carapace struck and removed along the first semicircular run is thereafter conveyed along one of the parallel runs of said second conveyor moving along a carapace moving direction co-planar with, substantially in the same general direction with and forming an acute angle with said conveying direction;

first guide centering means separate from and on one lateral side of said conveying path and a second guide centering means on the lateral opposite side of said conveying path; means mounting said centering means for movement laterally toward and away from each other and said conveying path; means biasing said centering means towards said conveying path; and said centering means having inlet guide surfaces opening laterally outwardly towards the conveying direction and spaced divergingly from each other, so that said centering means will engage the sides of crab bodies being moved along said first conveying path and center said crab bodies;

linkage means interconnecting said centering means so as to maintain said centering means symmetrical with respect to the central plane of symmetry of said first conveying means at all times;

stationary means is a tube extending parallel to said conveying path throughout a major portion of its length and having an upstream end, with respect to the conveying direction, that flares outwardly away from said conveying path for facilitating entry into the body cavity;

spaced apart substantially parallel and complementary arcuate guide surfaces for engaging the same side of said crab body and receiving the crab legs therebetween;

cutter is a cutting disc rotatably mounted about a fixed horizontal axis;

resilient means is pivotally mounted about a fixed axis spaced from said fixed point and substantially perpendicular to said cutter axis of rotation.

30. A cleaning machine for crabs having a body, gills, viscera in a body cavity, legs, tail, carapace, and pincers, comprising:

first conveyor means for moving crabs along a conveyor path in a conveying direction with the heads and tails of the crabs aligned with the conveying path;

first guide centering means separate from and on one lateral side of said conveying path and a second guide centering means on the lateral opposite side of said conveying path; means mounting said centering means for movement laterally toward and away from each other and said conveying path; means biasing said centering means towards said conveying path; and said centering means having inlet guide surfaces opening laterally outwardly towards the conveying direction and spaced divergingly from each other, so that said centering means will engage the sides of crab bodies being moved along said first conveying path and center said crab bodies;

means for removing the carapace from the crab bodies as they move along said conveying path downstream of said centering means with respect to the conveying direction; and means for removing the viscera and gills from the crab bodies downstream, with respect to the conveying direction, from the centering means, as said crabs move along said conveying path.

31. The crab cleaning apparatus of claim 30, linkage means interconnecting and centering means so as to maintain said centering means symmetrical with respect to the central plane of symmetry of said first conveying means at all times.

32. The crab cleaning apparatus of claim 31, wherein said linkage means is a toggle linkage extending between said centering means, and said biasing means is a weight drivingly secured to the center of the toggle linkage.

* * * * *